UNITED STATES PATENT OFFICE.

FREDERICK TSCHIRNER, OF NEWARK, NEW JERSEY.

PROCESS FOR EXTRACTING POTASSIUM SALTS.

1,254,450.  Specification of Letters Patent.  Patented Jan. 22, 1918.

No Drawing.  Application filed April 18, 1916. Serial No. 91,847.

*To all whom it may concern:*

Be it known that I, FREDERICK TSCHIRNER, a citizen of the United States, residing at Newark, in the county of Essex and State of New Jersey, have invented certain new and useful Improvements in Processes for Extracting Potassium Salts; and I do hereby declare the following to be a full, clear, and exact description of the invention, such as will enable others skilled in the art to which it appertains to make and use the same.

My present invention relates to an improved process for the extraction of potassium salts from glauconite and allied minerals. This improved process has the advantages of avoiding the serious obstacles to successful commercial operation met with in other processes, as well as making cheap materials successfully available.

Glauconite is essentially a hydrous silicate of iron and potassium in which the iron is contained partly as ferrous and partly as ferric salts. It follows, therefore, that such processes as employ acids in decomposition of this mineral are made difficult because the acids react first upon the iron oxids and excess quantities of the acid must, therefore, be employed, to prevent the formation of difficultly soluble basic salts. This necessity for the use of a large excess of acid makes the use of acid processes impracticable for the commercial extraction of the potassium.

On the other hand there is an equally serious objection to the use of caustic oxids such as lime, or lime and fluorids. These require such a high temperature to become effective that the mineral begins to fuse, forming clinkers before the process is completed, thus rendering extraction of the potassium very difficult and imperfect.

Another difficulty which has hitherto stood in the way of resorting to glauconite as a source of potassium salts is found in the high cost of the reagents heretofore proposed to be used. My process can be carried out with relatively common and cheap materials.

My process therefore combines the following advantages:

1st. The use of relatively cheap materials.

2nd. The formation of a soluble potassium compound without the production of soluble iron salts.

3rd. Completion of the essential reactions without using a temperature high enough to form clinkers by fusion of any of the constituents, and without leading to any material losses of potassium compounds by volatilization.

While my improved process secures the first-mentioned advantage, it may, of course, be carried out by the use of more expensive substitutes for the substances or reagents hereinafter named, without departing from the scope of my invention as set forth in the claims hereto appended.

In the practice of my invention in its preferred embodiment I proceed as follows:—

I mix one hundred (100) parts by weight of greensand marl (glauconite) with sixty (60) parts of lime sand (gray calcareous marl) deposits of which are commonly found associated with the beds of greensand. This mixture is submitted to a preliminary roasting at a temperature of about 600 degrees C., care being taken to avoid a heat sufficient to form clinkers. The result of this first roasting is two-fold. First— the greensand is dehydrated, turning from green to brown. Second—the calcium carbonate of the gray marl is largely converted into caustic oxid of lime.

This mixture, after roasting, is pulverized under water by ball mills, and either during or after this step in the process, chlorin gas is introduced. The water slakes the lime, and the chlorin produces a mixture of calcium chlorid and calcium hypochlorite. The addition of the chlorin is preferably continued until about one half of the lime has been converted into chlorid and hypochlorite.

This ground and chlorinated mixture is now dried and the caked mass is pulverized, for example in a dust mill. In this condition the mass is subjected to the final roasting at a temperature safely below that which would produce clinkers, which must be avoided by all means. This temperature may be about, and even a little over 800 degrees C. The end of the roasting process is recognized by a change in the color of the mass from brown to a light yellow.

This roasted mass will have the appearance of fine yellow sand. It is ground in ball mills with water and thoroughly leached with water. The liquor is slightly caustic, but mainly contains potassium and calcium chlorids together with small quantities of sodium chlorid. These are separated in any well known manner.

The action of the calcium hypochlorite is to oxidize the ferrous to ferric salts, which are in turn converted into insoluble iron compounds by the action of the lime, thus avoiding all soluble iron salts at the time of final leaching: and, at the same time, forming calcium and potassium chlorids by union with the chlorin set free in the reaction. The calcium chlorid formed during the chlorinating stage is not an essential to the process, although it has a beneficial effect. As above stated, this compound is produced as a by-product in any event.

It is obvious that the first step in my preferred process is merely resorted to in order to make available the cheap lime sand so often found associated with greensand beds. Instead of using lime sand and chlorinating, therefore, I may simply roast the greensand to dehydrate it and then mix the proper proportions of slaked lime and chlorinated lime (bleaching powder) which latter supplies the calcium chlorid and hypochlorite.

My invention covers the use of well known substitutes for the given reagents. For instance, instead of calcium oxid (preferred for its cheapness) other oxids or allied compounds of the alkali or alkaline earth metals may be used, such as sodium hydroxid, barium oxid, magnesium oxid or strontium oxid. In these cases, of course, the corresponding chlorids and hypochlorites would enter into the reaction. In my claims I include all of these under the expression "suitable alkali." The term "glauconite" covers this mineral and its recognized allied silicates whether found as greensand or otherwise.

The material above referred to as "lime sand" or "gray calcareous marl," is a low grade of calcium carbonate material, which is found in some localities, in large beds, located near the greensand deposits. An analysis of a typical sample of this material, gave the following results:

Silica_____ 14.38%
Iron oxid and alumina___ 6.72%
Carbonate of lime_____ 71.12%
Carbonate of magnesia___ 3.81%
Potash _____ .48%

What I claim is—

1. The process of extracting potassium salts from glauconite which consists in dehydrating, oxidizing the ferrous salts to the ferric form, uniting the potassium with chlorin, and leaching to extract the soluble potassium salts resulting.

2. The process of extracting potassium salts from glauconite which consists in dehydrating, mixing with a suitable alkali partly chlorinated, roasting and leaching to extract the soluble potassium salts.

3. The process of extracting potassium salts from glauconite which consists in dehydrating, mixing with calcium oxid and hypochlorite, roasting and leaching to extract the soluble potassium salts.

4. The process of extracting potassium salts from glauconite which consists in dehydrating, mixing with a suitable alkali and hypochlorite, roasting and leaching to extract the soluble potassium salts.

5. The process of extracting potassium salts from glauconite which consists in dehydrating, mixing with slaked lime, calcium chlorid and calcium hypochlorite, roasting and leaching to extract the soluble potassium salts.

6. The process of extracting potassium salts from greensand which consists in mixing therewith a suitable proportion of gray calcareous marl, roasting, grinding in water and treating with chlorin gas, drying and roasting until the mass turns yellow and leaching to extract the soluble potassium salts.

7. The process of obtaining potassium salts from minerals containing ferrous and ferric iron and potassium, which consists in oxidizing the iron from the ferrous to the ferric state and causing the potassium to combine with chlorin at a suitable high temperature, and then leaching to extract the potassium chlorid so formed.

In testimony whereof, I have affixed my signature.

FREDERICK TSCHIRNER.